(12) United States Patent
Müller

(10) Patent No.: US 8,369,982 B2
(45) Date of Patent: Feb. 5, 2013

(54) METHOD AND DEVICE FOR INSERTING, COLLECTING OR COLLATING A PLURALITY OF FLEXIBLE, PLANAR PRODUCTS

(75) Inventor: Erwin Müller, Dürnten (CH)

(73) Assignee: Ferag AG, Hinwil (CH)

( * ) Notice: Subject to any disclaimer, the term of this patent is extended or adjusted under 35 U.S.C. 154(b) by 485 days.

(21) Appl. No.: 12/452,624

(22) PCT Filed: May 29, 2008

(86) PCT No.: PCT/CH2008/000243
§ 371 (c)(1),
(2), (4) Date: Jan. 11, 2010

(87) PCT Pub. No.: WO2009/012604
PCT Pub. Date: Jan. 29, 2009

(65) Prior Publication Data
US 2010/0138033 A1      Jun. 3, 2010

(30) Foreign Application Priority Data
Jul. 20, 2007   (CH) ...................................... 1175/07

(51) Int. Cl.
*G06F 7/00* (2006.01)
(52) U.S. Cl. ........ 700/218; 700/213; 700/219; 700/223; 700/224; 700/228
(58) Field of Classification Search .................... None
See application file for complete search history.

(56) References Cited

U.S. PATENT DOCUMENTS

| 5,003,485 | A | * | 3/1991 | Francisco | 700/221 |
| 5,185,866 | A | * | 2/1993 | Francisco | 710/100 |
| 5,321,602 | A | * | 6/1994 | Francisco | 700/17 |
| 6,082,724 | A | | 7/2000 | Kahlig et al. | |
| 6,604,017 | B1 | * | 8/2003 | Richardson et al. | 700/223 |

FOREIGN PATENT DOCUMENTS

| CH | 688 091 A5 | 5/1997 |
| DE | 196 33 744 A1 | 2/1998 |

(Continued)

*Primary Examiner* — Gene Crawford
*Assistant Examiner* — Yolanda Jones
(74) *Attorney, Agent, or Firm* — Pauley Petersen & Erickson

(57) ABSTRACT

The invention relates to a device for inserting, collecting or collating a plurality of flexible, planar products, preferably printed products, wherein the device (10, 10a, 10b) comprises a product collection unit (12, 12a), a first processing unit (14, 14'), and a second processing unit (16, 16', 16') for the synchronized processing, for example feeding, of products. The product collection unit (14, 14') comprises a main drive controller (18), which is operatively connected to a main drive (20, 20') for driving a conveying means (22). The first processing unit (14, 14') comprises a first drive controller (24, 24'), which is operatively connected to a first drive (26, 26', 26'), and the second processing unit (16, 16', 16') comprises a second drive controller (28, 28', 28'), which is operatively connected to a second drive (30, 30'). The first processing unit (14, 14') additionally comprises a first data collector (34, 34'), which is connected to the main drive controller (18) and to the first drive controller (24, 24') via a first data bus (32, 32'), while the second processing unit (16, 16', 16') comprises a second data collector (36, 36'), which is connected to the first drive controller (24, 24') and the second drive controller (28) via the first data bus (32, 32').

22 Claims, 3 Drawing Sheets

FOREIGN PATENT DOCUMENTS

| | | |
|---|---|---|
| EP | 0 344 102 A2 | 11/1989 |
| EP | 0 376 743 A2 | 7/1990 |
| EP | 0 672 603 A1 | 9/1995 |
| EP | 0 681 979 A1 | 11/1995 |
| EP | 0 894 758 A | 2/1999 |
| EP | 0 917 965 A1 | 5/1999 |
| EP | 0 989 498 A2 | 3/2000 |
| EP | 1 029 705 A1 | 8/2000 |
| EP | 1 525 998 A2 | 4/2005 |
| GB | 2 283 836 A | 5/1995 |
| WO | WO 90/09474 A1 | 8/1990 |
| WO | WO 2003/053831 A1 | 7/2003 |
| WO | WO 2003/054644 A2 | 7/2003 |

* cited by examiner

METHOD AND DEVICE FOR INSERTING, COLLECTING OR COLLATING A PLURALITY OF FLEXIBLE, PLANAR PRODUCTS

BACKGROUND OF THE INVENTION

1. Field of the Invention

The present invention falls into the field of postpress processing; it relates to an apparatus for inserting, collecting or collating two-dimensional products in accordance with the preamble of patent claim 1 and to a method for inserting, collecting or collating two-dimensional products in accordance with the preamble of patent claim 15.

2. Discussion of Related Art

The prior art discloses installations for inserting, collecting or collating products which have a main unit with a conveyor means and a plurality of ancillary units with dedicated drives for supplying products to the conveyor means.

The ancillary units are supply conveyors, for example, and need to have their timing coordinated with respect to one another in order to ensure a desired location for the product they are supplying relative to a predefined position on the conveyor means. Since one and the same supply conveyors have to be used to deliver products of different length to the conveyor means and the distance from one ancillary unit to another ancillary unit is not always optimum in terms of timing on account of physical constraints, appropriate measures need to be taken so as nevertheless to ensure synchronized supply of products to the conveyor means. One such measure is shifting the phase of the supply conveyor, or of the supply conveyors, relative to the phase of the conveyor means. The phase is ideally 100%, that is to say that the operating cycle of the supply conveyors corresponds precisely to the operating cycle of the conveyor means. For the reasons cited above, the operating cycles of the supply conveyors need to be adjusted relative to the operating cycle of the conveyor means. Such a shift in the phase can take place only within an operating cycle of the conveyor means, however. The phase is typically calculated in a central controller or in a drive controller/control system which is associated with each ancillary unit, said central controller and said drive controllers/control systems of the ancillary units being connected to one another via a data bus. To calculate the time of supply, further signals need to be transmitted to the drive controllers/control systems of the ancillary units, which in conventional installations results in numerous signals or data needing to be interchanged between the central controller and said drive controllers/control systems of the ancillary units, said signals often being analogue signals which require appropriate individual connections. Such connecting lines and connectors are generally a possible source of problems for optimum signal transmission, for example on account of electromagnetic incompatibilities, and are therefore accordingly susceptible to interference.

EP 0917 965 B1 discloses an embodiment in which data interchange between a plurality of drive controllers and a central controller is effected exclusively via a bus system, which reduces the number of connections between main and ancillary units. Additional signals are transmitted via the drive controller which is associated with each unit and via an input/output unit, associated with each drive controller, to a bus interface, where they are transferred to the data bus. The data bus therefore firstly transmits data from a preceding setup mode and data corresponding to the analogue signals between the central controller and the individual drive controllers.

The known apparatuses are inadequate in terms of transmission speed and data integrity.

SUMMARY OF THE INVENTION

In respect of an apparatus, it is therefore an object of the present invention to allow simplified, more secure and faster data traffic for a number of drive controllers or control systems with a main drive control system.

In respect of a method, it is also an object of the present invention to simplify and increase the security and speed of data traffic for a number of drive controllers or control systems with a main drive control system.

The object on which the invention is based for the apparatus is achieved with the features of claim 1. Further embodiments are the subject matter of dependent claims 2 to 14.

The invention is distinguished in that data from a main drive control system and from a number of drive control systems are transferred directly to a common data bus, which dispenses with the time-consuming detour via an input/output unit, as is the case in the prior art. In addition, the direct transmission of data from the main drive control system and from each drive control system directly to the data bus reduces the probability of error for the data transmission and the error rate for the entire apparatus, since fewer components and fewer internal connections are required for transmitting these data.

In a first embodiment of the present invention, an apparatus for inserting, collecting or collating a multiplicity of flexible, two-dimensional products has a product collection unit and a multiplicity of handling units, but from now on the text will refer only to a first handling unit and a second handling unit by way of representation and to simplify the explanations.

The term products is understood to mean chiefly printed products or printer's products, and also subproducts such as inserts, postcards or advertizing product supplements. A product may be a newspaper, a magazine or a similar printer's product. In addition, the term product also covers multipart printed products which comprise at least one main product and one or more subproducts. Similarly, a subproduct may itself be multipart and may itself comprise main products and subproducts.

All the handling units are used for synchronized handling, for example for supplying and stitching products. In addition, the product collection unit has a main drive control system which is operatively connected to a main drive for the purpose of driving a conveyor means, said conveyor means usually being embodied by a collection drum or a collection belt. The first handling unit has a first drive control system which is operatively connected to a first drive. "Operatively connected" is understood to mean a control connection, which may also be indirect, however, i.e. can be routed via a plurality of components—not described in more detail here. The second handling unit has a second drive control system which is operatively connected to a second drive. The main drive control system and also the first and second drive control systems are furthermore operatively connected to one another via a first data bus. In addition, the first handling unit has a first data collector which is connected to the main drive control system and to the first drive control system via the aforementioned first data bus. Similarly, the second handling unit has a second data collector which is connected to the first drive control system and to the second drive control system via the first data bus.

Furthermore, the small number of parts or components means that the apparatus according to the invention is not so costly in comparison with the prior art and can be operated more economically on account of the low maintenance complexity. In view of the large numbers of items which are customary in postpress processing with comparable apparatuses, for example 30 000 to 40 000 copies per hour, a correspondingly large volume of data arises which needs to be processed in the controller, the main drive control system and each drive control system. With such levels of clock cycles, the error rate inherent in every component (MTBF) therefore becomes relevant and contributes to a significantly lower total error rate in comparison with the prior art.

In a further embodiment, the product collection unit has a first controller which is preferably connected to the main drive control system directly via the first data bus. Such an arrangement of local intelligence in the form of a controller can now be used specifically to relieve the load on a superordinate unit which prescribes the commands for the present apparatus. In the present case, the first controller is relieved of load specifically by the first and second drive controllers, which undertake ascertainment of the target values, that is to say phase synchronization, for their respective drives locally. In this case, the main drive control system and the first and second drive control systems preferably serve only as phase controllers, whereas the first data collector and the second data collector replace corresponding local controllers, for example conventional PLC controllers.

The first controller therefore has sufficient capacity to undertake error management, for example.

A person skilled in the art is familiar with field buses, Ethernet and Industrial Ethernet, and also particularly the extension for Real-Time Ethernet and Fast Ethernet, for data communication between individual subscribers involved in the control of a process. Examples of known field buses are CAN bus, Profibus, Modbus, DeviceNet or Interbus. The bus subscribers communicate by Ethernet using specified protocols. In addition, the demands on network capability are known in order to provide simple and inexpensive communication mechanisms and in order to link industrial devices to such a network. The need to couple drive components, for example between drive control systems, power circuits and transmitters in numerically controlled machine tools and robots is also known, these requiring a polarity of interpolating axles to be operated in sync.

Since the first data bus in the present embodiment is preferably implemented with EtherCat (Ethernet for Control Automation Technology), data interchange between the subscribers (e.g. drive control systems etc.) is assured in real time.

The real-time data transmission allows the intelligence not to be decentralized so as to cause a high level of control and alignment complexity but rather to be left centrally, but without having to dispense with the advantages of local intelligence completely. On account of the high data rate of 500 bytes per second in EtherCat, the controller does not recognize that it is not actuating the main drive and the first and second drives directly but rather that the slaves thereof (i.e. the first and second drive controllers) undertake this. The short cycle times in EtherCat are a result of the continuous processing which lead to good bandwidth utilization, since the first controller, the main drive control system, the first and second drive control systems and the first and second data collectors do not require a dedicated frame at each time.

On account of the performance capability of EtherCat, it is possible to enter in a frame not only a guide value, actual single cycle and actual fine cycle but also, by way of example, the status of the product collection unit and of all handling units, the counters thereof, threshold value, speeds and limit values.

In addition, in one particularly preferred apparatus, the main drive has an associated first sensing element for sensing a first actual value, also called actual fine cycle. Since sensing elements, like rotary encoders associated with, or incorporated in, the drive motor, are known to a person skilled in the art, a detailed description thereof is dispensed with at this juncture. The first actual value is supplied to the main drive control system via a first connection, preferably in the form of a conventional signal line.

Since even good drives are not perfect, a small error in the angle synchronism in respect of the movement brought about by the drive motor on the effective conveyor means arises for every movement made by the drive motor on account of gear backlash owing to wear, and also mathematical rounding, which is expedient for control purposes, of a decimal place in the number Π (pi). On account of the large numbers of items in postpress processing, this quickly results in multiple errors per hour, which is intolerable. For this reason, one preferred development of the present apparatus involves the conveyor means having an associated second sensing element for sensing a second actual value, also called actual single cycle. The sensing element is connected to the main drive control system via a second connection, preferably a second signal line.

In a further, preferred embodiment of the apparatus in the present invention, at least the first, but preferably also the second, handling unit is of modular design. This provides an operator of the apparatus with the opportunity, at least in the case of first and second handling stations which are of identical design specifically in terms of the interface, to exchange the first handling unit for the second handling unit, and vice versa. In addition, the flexibility of the apparatus is increased, since in the event of a faulty first handling unit it is possible for said handling unit to be quickly replaced by an identical or at least—specifically in terms of the interface—compatible handling unit without needing to accept long downtimes for the entire apparatus.

For control purposes, a further, preferred embodiment of the apparatus involves the first controller being connected to a superordinate unit via a second data bus. By way of example, the superordinate unit is a superordinate data collector which has no intelligence and merely instructs the first controller what needs to be produced in the present apparatus with what structure. By virtue of the fact that it is not the first data bus which is used for this purpose but rather a separate second data bus, it is possible to tell that improved control certainty in comparison with the prior art is achieved. This is significant when the data interchange on the first data bus collapses as a result of overload, for example, and it allows the apparatus to be switched off under control nevertheless. In an online mode of the apparatus, an upstream rotary printing machine, for example, forms a superordinate master and uses the second data bus—preferably likewise an EtherCat bus— to communicate with the first controller, which for this purpose is accordingly defined as a slave. Any production variations in the rotary printing machine are controlled by the apparatus by means of the first controller as appropriate, for which reason the conveying capacity of the conveyor means can be continuously adjusted as appropriate. In an offline mode, the speed of the conveyor means is by contrast largely constant, and the first controller forms the master.

In one particularly preferred embodiment of the apparatus, the second handling unit is an initial collection apparatus and therefore has an initial product collection unit and also a first initial handling unit and a second initial handling unit for synchronized handling, preferably for supplying products. In a similar fashion to the handling units, the terms first initial handling unit and second initial handling unit are not intended to be understood to be limiting, but rather are merely intended to be understood as representatives of any number of initial handling units for the purpose of simplified explanation.

Preferably, the initial handling units are formed by supply conveyors for supplying identical and/or different subproducts to form an initially collected stack. Whether these supply conveyors are in the form of bundle feeders or have another design is not important to the control situation described below. The initial product collection unit has a second controller instead of the second data collector, said second controller being operatively connected to the second drive via the second drive control system for the purpose of driving an initial conveyor means. The first initial handling unit has a first initial drive control system which for its part is operatively connected to a first initial drive. Moreover, the second initial handling unit has a second initial drive control system which is operatively connected to the second initial drive. The second drive control system and the first and second initial drive control systems are operatively connected to one another via a third data bus in a line structure. Since the control scheme for the initial collection apparatus is of similar design to the control scheme for the entire apparatus, the second drive accordingly has an associated third sensing element for sensing a third actual value for the second drive. This third actual value is subsequently also called the second actual fine cycle. This third sensing element is accordingly connected to the second drive control system by a third connection, preferably a third signal line. In addition, the first initial handling unit has a first initial data collector which is operatively connected to the second drive control system and to the first initial drive control system. Accordingly, the second initial handling unit has a second initial data collector which is operatively connected to the first initial drive control system and to the second subordinate drive control system.

To prevent the previously explained error, the second drive motor and the initial conveyor means driven thereby have an associated fourth sensing element between them for sensing a fourth actual value for the initial conveyor means, subsequently also called second actual single cycle. This fourth sensing element is connected to the second drive control system via a fourth connection, preferably a fourth signal line.

Control logic of this kind relieves the first controller of a substantial number of computation operations, since the second controller continues to have a slave function therefor and hence sends it only a limited number of data items in unfiltered form. The second controller also has a master function, in terms of control, for its associated initial data collectors and the initial drive controllers thereof. So as not to overload the first data bus locally and in order to avoid a long spur in the line structure of the first data bus, the data interchange is effected on a separate, second data bus.

It is also possible to connect the second data bus to the first data bus via a coupling element.

In a further embodiment of the apparatus, a data bus subscriber defined as a slave—for example the first data collector—with the first drive control system temporarily becomes a master. This dual function allows the first data collector, for example, within an area of competence which is acknowledged for it, to autonomously decide in a subfunctionality in situ whether it needs to send an adjacent slave, for example the second data collector, control data directly which overlap the guide data or guide values of the first controller. To allow such slave-to-slave communication between data bus subscribers, no slave of which has a bus master functionality, in the case of the first data bus with sequentially circulating frame traffic, the protocol chip of the bus subscriber that wishes to send data to other bus subscribers is preferably complemented by a transmission memory and possibly a reception memory.

To prevent the previously explained error between the drive motors and the conveyor means or initial conveyor means driven thereby, both the product collection unit and the initial product collection unit and also the handling units and initial handling units respectively have a dedicated actual fine cycle sensing element and a dedicated actual single cycle sensing element. These are used for the main drive control system and for the second drive control systems firstly for local readjustment in the event of an error and secondly as a basis for calculating a guide value for the phase shift in their associated handling stations, while the first and second initial drive control systems are used exclusively for locally readjusting the first or second initial drive.

In a further embodiment of the apparatus, a signal regenerator (repeater) for bridging purposes is arranged with the first drive control system, which receives the bus signals, that is to say the Ethernet/EtherCat frames, and forwards them in freshly conditioned form to the second data collector if the first drive control system fails. This makes it possible to ensure that the subscriber components which are "downstream" in the line structure, such as data collector or drive controllers, continue to be reliably supplied with data.

In a further embodiment of the apparatus, a collection drum with saddles arranged on the perimeter, but preferably with pockets, forms the conveyor means. The first handling unit is preferably a supply conveyor and the second handling unit is a delivery conveyor. In a further embodiment of the apparatus, a further handling unit forms a stitching station.

In addition, in a further embodiment of the apparatus, the collection drum has a first drum element and a second drum element which are of circularly cylindrical design in a known manner and are arranged so as to have an axially linear profile. In this case, the drum element forms the conveyor means and the second drum element forms a further conveyor means within the context of the conveyor means idea. The conveyor means and the further conveyor means are accordingly operatively connected to the main drive control system via a first main drive, and a second main drive, respectively, such that the first drum element and the second drum element can be driven on the basis of and independently of one another and can be synchronized to one another. Such collection drums with a plurality of drum elements are known to a person skilled in the art from EP 0344102 A2, EP 0672603 A1 and EP 0681979 A1. A collection drum of such design increases the flexibility of use for the operator by virtue of either one product, preferably a printed product, with five subproducts or two printed products with two subproducts each being able to be produced in the case of six supply conveyors, for example.

In a further embodiment of the apparatus, the conveyor means is formed by a conveyor belt, said conveyor belt ideally having low stretch and being dimensionally stable. Such an apparatus can be used for collecting products in stacks, for example, said products subsequently being packaged in a film bag.

In a further embodiment of the apparatus, the conveyor belt has fan-like compartments into which subproducts and/or main products are tossed or directed. Inclining the fans relative to a conveyor direction of the conveyor belt ensures that the collected products are in a preferred position, namely on a lateral wall of a compartment which forms a stop for the obliquely situated products and/or supplied subproducts.

In a further, preferred embodiment of the apparatus, the main drive and also the first and second drives are driven, in terms of power, by a respective power element, preferably an angle-synchronized frequency converter. Each of said power elements are connected, for control purposes, to their associated main drive control system or to the first or second drive controller via a respective dedicated subordinate data bus. The conscious isolation of the control signal plane from the power plane firstly increases fail-safety by means of a physical distance between signal loop and control loop and alleviates known problems, such as interference signals in the control loop on account of spikes in the power loop. The power elements are preferably used as simple actuators which ensure low-maintenance, stable operation of the apparatus.

In a further embodiment of the apparatus, the main drive control system and/or the first drive control system and/or the second drive control system are respectively connected to a plurality of power elements for the purpose of driving a plurality of drives. This means that a plurality of power elements share an associated drive control system. In a further form of the apparatus of the present invention, the subordinate data bus is routed only as far as a first power element, while a further power element is configured—in other words connected in parallel—as a slave of the first power element.

The problem on which the invention for the method is based is solved by means of the features of claim 15. Further embodiments of the method are the subject matter of dependent claims 16 to 22.

In a first embodiment of the present method, reference is made to the description above for the structural design of the apparatus required for this purpose. The main drive is controlled by means of a main drive control system, while the first and second drives are controlled by a first and a second drive control system. The main drive control system and the first and second drive control systems interchange data via the first data bus. The first controller also communicates with the main drive control system via the first data bus. When sending data from the main drive control system for the second drive control system, said data are written to an EtherCat frame by the first controller, and said frame is delivered to the second drive control system by the first data bus successively via the first data collector, the first drive control system and the second data collector.

To prevent the error already explained above between the main drive motors and the conveyor means driven thereby, one particularly preferred embodiment for the present method involves the first actual value for the main drive (to be precise the main drive motor thereof) and preferably also the second actual value for the conveyor means driven by the main drive being sensed and being transmitted to the main drive control system. On the basis of these data, the main drive control system compensates for local target/actual differences and therefore prevents accumulation of errors.

If a handling unit is formed by an initial collection apparatus, a similar process takes place in one particularly preferred embodiment of the method. To this end, the third actual value for the second drive (to be precise the drive motor thereof) and preferably also the fourth actual value for the initial conveyor means driven by the second initial drive are sensed and are transmitted to the second drive control system. The second drive control system compensates for local target/actual differences on the basis of these data and prevents accumulation of errors, which relieves the load on the second controller in targeted fashion.

In a further embodiment of the present method, the first data bus transmits its data transferred to it in real time and the first controller, the main drive controller, the first and second drive control systems and the first and second data collectors read in and out the data sent to them from this first data bus. In this case, data from the handling stations, or the slave subscribers thereof, are preferably read out by the first controller in order to keep the coordination complexity between all bus subscribers as low as possible.

In a further embodiment of the present method, the main drive control system produces a guide value and writes said guide value together with the first actual value and the second actual value preferably into the data bus frame of the first data bus. Guide value is understood to mean an ascertained target phase for a handling station relative to the conveyor means. By way of example, a target phase is plus 15%, which corresponds to a phase shift of 15%. The aforementioned frame is transmitted to the first drive control system via the first data collector, whereupon said drive control system ascertains a first target value therefrom for the first drive thereof. The same frame then proceeds and is transmitted to the second drive control system via the second data collector, whereupon said drive control system ascertains a second target value therefrom for the second drive thereof.

BRIEF DESCRIPTION OF THE DRAWINGS

The invention is explained below with reference to figures, which merely show exemplary embodiments and in which.

DETAILED DESCRIPTION OF THE INVENTION

Figure 1:
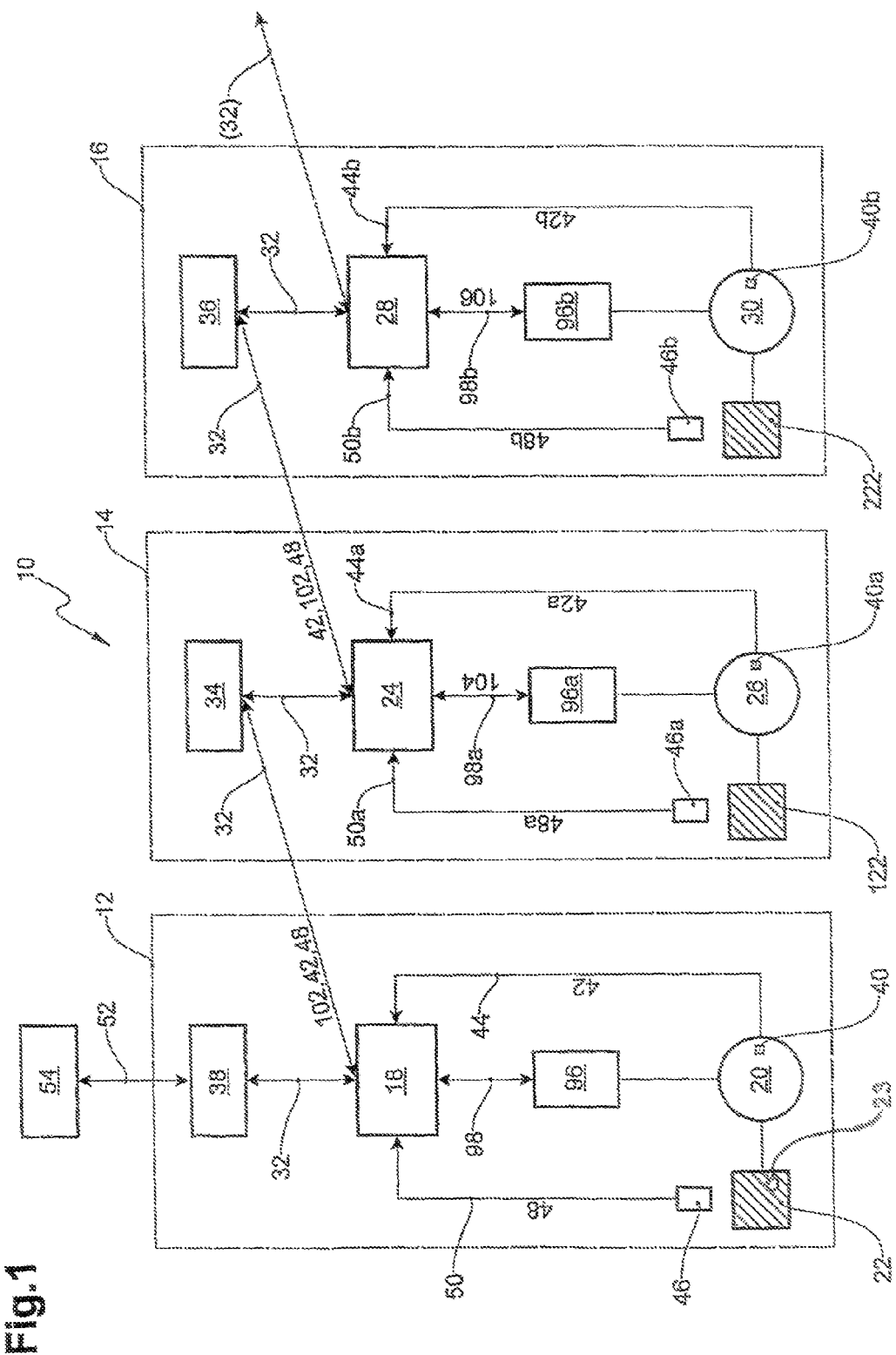
FIG. 1 shows a control scheme for an apparatus in line with a first embodiment of the present invention.

FIG. 1 shows a control scheme from a first embodiment of an apparatus 10 based on the present invention. The apparatus has three units arranged next to one another, namely a product collection unit 12, a first handling unit 14 and a second handling unit 16. To the right of the second handling unit 16, one or more further handling units would be conceivable.

The product collection unit 12 has a first controller 38 which is connected to a main drive control system 18 via a first data bus 32. The first data bus is formed by an EtherCat bus. The main drive control system 18 is connected to a power element 96 via a subordinate data bus 98, said power element being formed by an angle-controlled frequency converter. The power element 96 is connected to a main drive 20 via a conventional power connection. The main drive 20 is connected to a conveyor means 22 for drive purposes. In addition, the product collection unit 14 has a first sensing element 40 for sensing a rotary position of the main drive 20, or the drive motor thereof. This first sensing element is a rotary encoder, which in the present case is formed by an incremental encoder arranged directly in the main drive 20. The first sensing element 40 is connected to the main drive control system 18 via a first connection 44, which is in the form of a conventional signal line 44. In addition, the product collection unit 12 has a second sensing element 46. This second sensing element 46 is an induction sensor, which is used to sense a rotary position for the conveyor means 22 driven by the main drive 20. The second sensing element 46 is connected to the main drive control system 18 via a second connection 50, which is in the form of a conventional signal line 50.

At least one of the handling units 14, 16 in this arrangement is intended as a delivery conveyor for transporting away the collected, inserted or collated products. Since such delivery conveyors are known, they are not discussed in more detail.

The first handling unit 14 is of the same design, in control terms, as the product collection unit 12. In this case, a first drive control system 24 corresponds to the main drive control system 18, while a first drive control system 24 corresponds to the main drive control system 18, a power element 96a is of the same design as the power element 96, a further first sensing element 40a is of the same design as the first sensing element 40, a further second sensing element 46a is of the same design as the second sensing element 46, and a first handling means 122 is arranged instead of the conveyor means 22. Instead of the first controller 38, however, a first data collector 34 is arranged in the first handling unit 14.

The second handling unit 16 is of similar design to the first handling unit 14. In this case, a second drive control system 28 corresponds to the first drive control system 24, a power element 96b is of the same design as the power element 96a, a further first sensing element 40b is of the same design as the further first sensing element 40a, a further second sensing element 46b is of the same design as the further second sensing element 46a, and a second handling means 222 is arranged instead of the conveyor means 122. Instead of the first data collector 34, a second data collector 36 is arranged in the second handling unit 16.

A first data bus 32 connects the first controller 38 to the main drive control system 18, the main drive control system 18 to the first data collector 34, the first data collector 34 to the first drive control system 24, the first drive control system 24 to a second data collector 36 and the latter to a second drive control system 28. Stylized continuation of the first data bus 32 to further handling stations—not shown here—is distinguished by data bus 32. In the present case, the first controller 38 forms a master with coordination and monitoring intelligence, to which the low-intelligence bus subscribers defined as slaves, main drive control system 18, first and second data collectors 34, 36, and the first and second drive control systems 24, 28, are hierarchically subordinate. Thus, data from the first controller 38, which are provided for the second drive control system 28, are successively transmitted via the main drive control system 18, the first data collector 34, the first drive control system 24 and the second data collector 36 to the second drive control system 28.

For control purposes, the apparatus is actuated by a superordinate data collector 54 via a second data bus 52. In this case, the second data bus 52 is likewise formed by an EtherCat bus. In an offline mode of the apparatus 10, the input is made using a superordinate computation unit or using an input station—not denoted in more detail—, for example, and the first controller 38 forms the master for the bus subscribers which are subordinate to it, defined as slaves. In an online mode, a rotary printing machine typically forms the master and prescribes the clock cycle as a target value for the first controller 38. In this case, the first controller 38 serves as a slave toward said superordinate unit 54 (e.g. the rotation) and is at the same time the master over the main drive control system 18, which is subordinate to it, and the first and second data collectors 34, 36, or the first and second drive control systems 24, 28.

The apparatus of this kind is used for inserting, collecting or collating flexible, two-dimensional products, primarily printer's products. The insertion typically involves subproducts being transferred from a plurality of supply conveyors to a conveyor means, to which end the conveyor means is preferably in the form of an insertion drum, clamp conveyor or conveyor belt. For collection, the conveyor means is a collection drum or a linear conveyor with saddles onto which the folded subproducts are placed astride, for example. One such linear conveyor for collection is known from CH 688091 A5, for example. For collation, a linear conveyor with a circumferential conveyor belt typically forms the conveyor means, in this case, the products and/or subproducts are collated to form a stack. One such linear conveyor for collation is known from WO 03/053831 A1 or EP 1029705 1, for example. Conveyor means 22 is then accordingly also understood to mean an insertion, collection or collation apparatus, which are in the form of clamp conveyors, belt, drum or rung conveyors, for example. In one embodiment of the apparatus, the conveyor means 22 includes fan-like compartments 23 into which products and/or subproducts are tossed or directed.

A common feature of all the aforementioned apparatuses is that they have a multiplicity of handling units, which are typically in the form of supply conveyors. These supply conveyors supply the conveyor means with the respective main or subproduct in phase sync. Supply conveyors are understood to mean, by way of example, bundle feeders, transporters with claws, clamp feeders, winding feeders, and also initial collection apparatuses, which for their part may again contain initial collection apparatuses.

The synchronization between the handling units 14, 16 and the product collection unit 12 entails a multiplicity of data items which need to be interchanged with one another. Thus, the power element 96 uses the subordinate data bus 98 to communicate with the main drive control system 18. Similarly, the power elements 96a and 96b use subordinate data buses 98a and 98b to communicate with their associated first and second drive control systems 24, 28. Using EtherCat as the first data bus 32, the data to be interchanged are entered into an Ethernet frame 100 and routed sequentially and in real time along each bus subscriber in line with the linear structure. The first controller 38, the first and second data collectors 34, 36 and the main drive controller 18, the first and second drive control systems 24, 28 can read the data intended for them from the frame and, particularly in the case of the first controller 38, can also write them.

In parallel therewith, the first and second actual values 42, 48 from the first and second sensing elements 40, 46 are transferred to the main drive control system 18 via the signal lines 44 and 50. Corresponding signals are sensed by appropriate further first sensing elements 40a, 40b and further second sensing elements 46a, 46b and are supplied to the first and second drive control systems 24, 28 via appropriate signal lines 44a, 44b, 50a, 50b.

The main drive control system 18 ascertains a guide value 102 and transmits it with the first actual value 42 and the second actual value 48 to the first drive control system 24 in frames via the first data collector 34. For the first drive control system 24, the first actual value 42 and the second actual value 48 form the target values. The first drive control system 24 takes the guide value 102, the first actual value 42 and the second actual value 48 as a basis for ascertaining a first target value 104 for the first drive 26. Analogously, the second drive control system 28 takes the guide value 102, the first actual value 42 and the second actual value 48 as a basis for producing a second target value 106 for the second drive 26.

Figure 2:
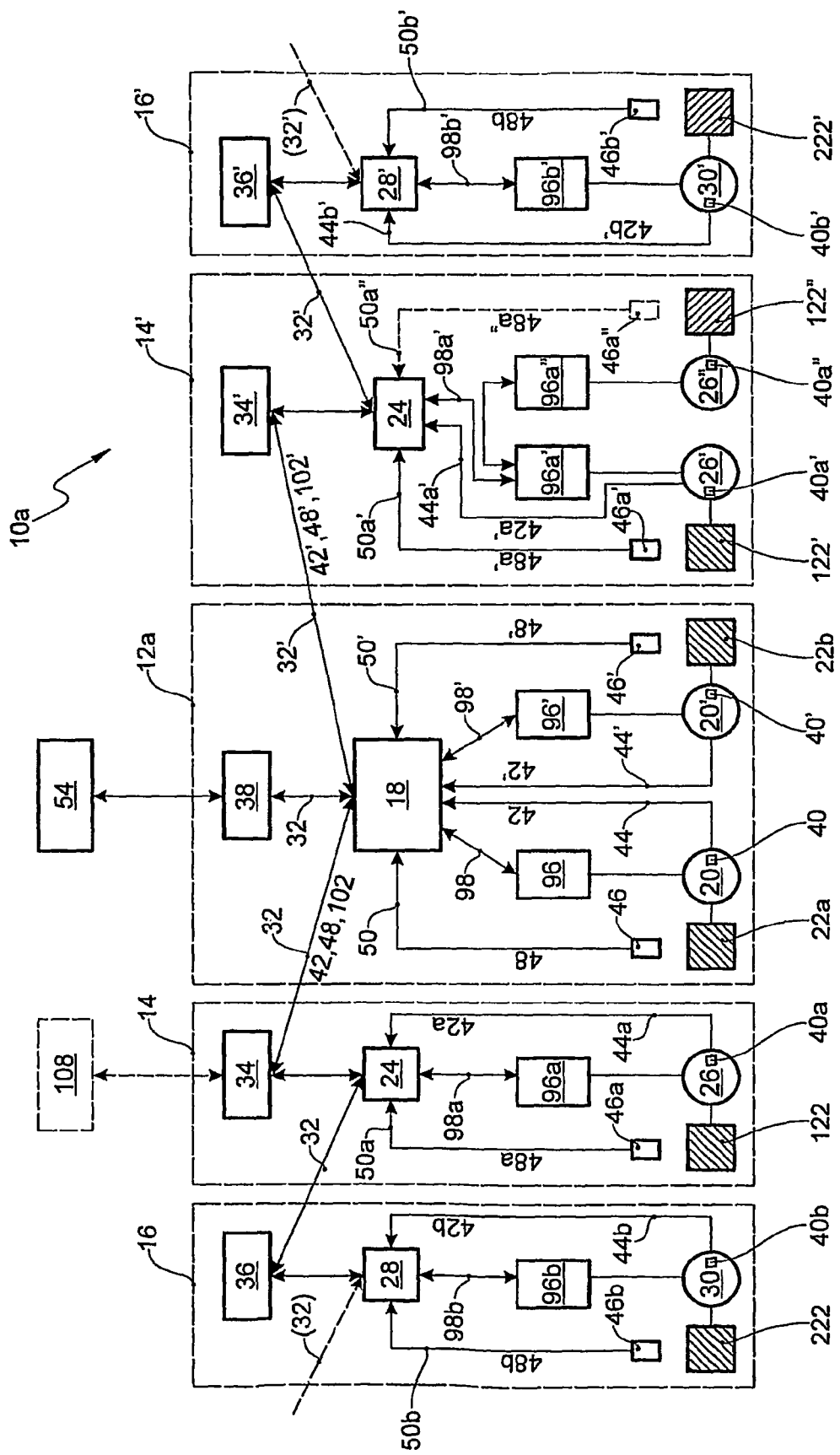
FIG. 2 shows a control scheme from a second embodiment.

FIG. 2 shows the basic design of the control logic for parallel processing or serial processing using a further embodiment of an apparatus 10a from the present invention. Processing is understood to mean insertion, collection or collation. Although both processing operations are subsequently explained with reference to a collection drum with a circular conveyor means 22, the explanations below also apply mutatis mutandis to linear conveyor means such as conveyor belts.

The apparatus 10a shown in FIG. 2 comprises a multipart conveyor means 22 with a two-part collection drum 22, having a first drum element as the first conveyor means 22a and a second drum element as the second conveyor means 22b, the longitudinal axes of which are typically flush, that is to say are situated on a common straight line. Since both the basic design and the control operation largely correspond to an apparatus as shown in FIG. 1 in principle, however, only the differences from that apparatus 10 are explained below, although all elements are noted. The apparatus 10a has a product collection unit 12a arranged essentially centrally with a first and a second handling unit 14, 16, 14', 16', respectively, on both sides, the first and second handling units 14', 16' being arranged and set up, in terms of design, so as to be basically a mirror image of the first and second handling units 14, 16 in this case. The difference between the first handling unit 14' and the first handling unit 14 will be discussed in more detail at another juncture.

In contrast to the drive situation of the apparatus 10 shown in FIG. 1, the product collection unit 12a has two drive trains. For this reason, each of the two main drives 20a, 20b also has a respective associated power element 96 and 96' which, as is known, can communication with the main drive control system 18 via a respective subordinate data bus 98 and 98'.

Since the first conveyor means 22a is intended to be able to be operated independently of the second conveyor means 22b, the first main drive 20a and the second main drive 20b are connected only to the first drum element and the second drum element, respectively. As a result, each drive train has a dedicated first and second actual value sensing unit with corresponding dedicated first and second sensing elements 40, 40', 46, 46' which then supply the ascertained values to the common main drive control system 18 via appropriate signal lines 44, 44' in a known manner. To provide a better overview, actual values 42, 42a, 42a', 42b, 42b', 48, 48', 48a, 48a', 48a", 48b, 48b' for the relevant sensing elements 46, 46', 46a, 46a', 46a", 46b, 46W are labeled across the writing direction which is otherwise used.

An apparatus 10a of such a design can be used to drive the first conveyor means 22a and the second conveyor means 22b both on the basis of and independently of one another. It goes without saying that the first conveyor means 22a and the second conveyor means 22b can also be driven in sync by their first main drive 20a and second main drive 20b. In a further embodiment—not shown here—of the apparatus 10a, the product collection unit 12a has an individually controlled first main drive 20a and an individually controlled second main drive 20b. To this end, the first main drive 20a is connected to a first main drive control system via a power element of the same design, while the second main drive 20b is connected to a second main drive control system via a further power element of the same design.

The first and second main drive control systems are controlled by the superordinate unit 54 preferably via the second data bus 52 and via a further data bus which corresponds to the second data bus 52, and can accordingly communicate with them. In a further embodiment—not shown—of the apparatus 10a, the first main drive control system corresponds to the main drive control system 18 and serves as a master for the second main drive control system, designed as a slave. In this case, the first main drive control system is connected to the superordinate unit 54 via the second data bus 52, and the first main drive control system is connected to the second main drive control system via a further data bus.

When products are processed in parallel, the first conveyor means 22a is typically supplied with subproducts by a first group of supply conveyors, and a first main product produced in this manner is removed, or accepted and routed away, by a first router associated with the first conveyor means 22a. Similarly, the second conveyor means 22b is typically supplied with subproducts by a second group of supply conveyors, and a resultant, second main product is then removed, or accepted and routed away, by a second router associated with the second conveyor means 22b. It is clear that the first and second main products in this case may be identical or different.

When products are processed in series, the first conveyor means 22a is typically supplied with subproducts by a first group of supply conveyors, and a first main product produced in this manner is removed, or accepted and supplied as an initial product to the second conveyor means 22b again, by a first router associated with the first conveyor means 22a. In the interim, the products can be labeled, for example. The second conveyor means 22b is typically supplied with further subproducts by a second group of supply conveyors, so that ultimately a single main product is produced. This main product is then removed, or accepted and routed away, by the second router, for example.

FIG. 2 reveals that a single drive control system caters for a plurality of drives (in the present case, two first drives 26', 26") independently of one another. This property is also shown by way of example with reference to the first handling unit 14'. With regard to the design with two drive trains in the first handling unit 14', the first handling unit 14' corresponds to the product collection unit 12a. Considered in control terms, however, it is of the same design as its mirror image—the first handling unit 14. Accordingly, an apostrophe (') in FIG. 2 reflects the symmetry. In the present embodiment, a subordinate data bus 98a' is routed to a power-element connection of a power element 96a' and from there onward to a second power element 96a". Considered in control terms, it is therefore also possible to refer to a slave mode of the second power element 96a", for which the first power element 96a' forms the master. Since the first drives 26' and 26" are actuated in the same way, sensing of a first local actual value 48a' is dispensed with, but not sensing of a second local actual value 48a", since this value is required for monitoring the first handling means 122".

Moreover, FIG. 2 has an additional element 108 which is a wildcard for a further peripheral device 108. The additional element 108 can be used to retrieve data from the first data memory 34 of the first handling unit 14 directly. The additional element 108 is a portable computer, a diagnosis device or an IPC (Interpace), for example.

Although FIG. 2 shows only a first and a second handling unit 14, 14', 16, 16', respectively, it is clear to a person skilled in the art that one or more further handling units may be arranged as appropriate on the left and right of the second handling units 16, 16'.

Figure 3:
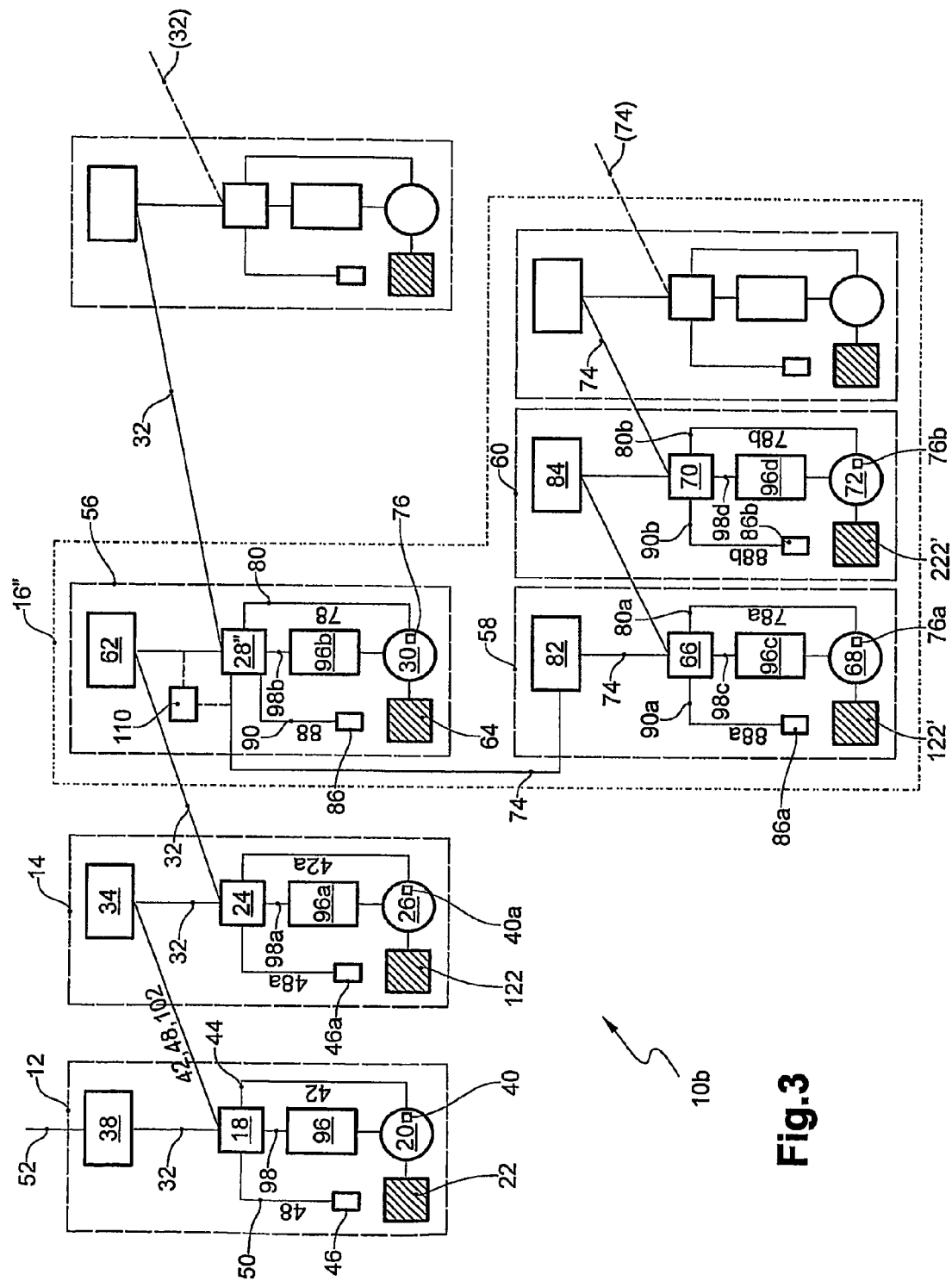
FIG. 3 shows a control scheme from a third embodiment.

FIG. 3 shows a further embodiment of the present invention using an apparatus 10b. The control-based design of the apparatus 10b fundamentally corresponds to the design shown in FIG. 1. In contrast to the apparatus 10 shown in FIG. 1, however, the apparatus 10b has a somewhat more complex handling unit 16" instead of a second handling unit 16 of simple design. Upon closer observation, it can be seen that this is a subordinate apparatus which is defined as an initial collection apparatus and has the same control logic and basically the same design as the apparatus 10 shown in FIG. 1. To the right of the second handling unit 16", a further handling unit is shown as representative of one or more further handling units. Similarly, to the right of the second initial handling unit 60, a further initial handling unit is shown as representative of one or more further initial handling units.

In comparison with the apparatus 10, an initial product collection unit 56 in the case of the second handling unit 16" corresponds to the product collection unit 12, a first initial handling unit 58 corresponds to the first handling unit 15, a second initial handling unit 60 corresponds to the second handling unit 16, a first subordinate data collector 82 corresponds to the first data collector 34, a second drive control system 28" corresponds to the second drive control system 28, a first initial drive controller 66 corresponds to the first drive controller 24, a second initial drive controller 70 corresponds to the second drive controller 28, a power element 96c together with subordinate bus 98c corresponds to the power element 96b together with subordinate bus 98b, a power element 96d together with subordinate bus 98d corresponds to the power element 96c with subordinate bus 98c, a third actual value sensing element 76 corresponds to the first actual value sensing element 40, a second actual value sensing element 86 corresponds to the second actual value sensing element 46, etc. For the sake of a better overview, the first and second actual values 42, 48, 78, 88 and the relevant local actual values 42a, 48a, 78a, 78b, 88a, 88b are labeled across the other reading direction.

FIG. 3 viewed together with FIG. 1 reveals that the design has been retained within the units, which is why a detailed description of the connecting lines is dispensed with on account of the functionality remaining the same.

The second drive control system 28" uses a second data bus 74 to communicate with the first initial data collector 82, the first initial drive control system 66, the second initial data collector 84 and the second initial drive control system 70.

Instead of a second data collector 36 defined as a slave, the initial product collection unit 56 contains a second controller 62 defined as a slave, without changing anything about the data bus connection of the first data bus 32. In addition, the second drive control system 28" has an additional bus interface for an industrial Ethernet bus in comparison with the second drive control system 28.

To allow data traffic between the first data bus 32 and the second data bus 52, an indicated embodiment of the apparatus 10b has the second data bus 74 connected to the first data bus 32 via an additional data link. In this case, the connection is made not directly but rather via a coupling element 110, however. The link is therefore shown as a dashed line.

In this embodiment with the apparatus 10b, the initial handling units 58, 60 are in turn defined as initial collection systems. In this case, the first and second initial data collectors 82 and 84 are accordingly replaced by a respective further controller, which in turn use a dedicated data bus (preferably again EtherCat) to communicate with their respective subordinate slaves.

The invention claimed is:

1. An apparatus (10, 10a, 10b) for collecting a multiplicity of flexible, two-dimensional products, including printer's products, the apparatus (10, 10a, 10b) comprising:
a product collection unit (12, 12a), a first handling unit (14, 14') and a second handling unit (16, 16', 16") for synchronized handling of a supply of products, wherein the product collection unit (14, 14') includes a main drive control system (18) which is operatively connected to a main drive (20, 20') for driving a conveyor means (22, 22a, 22b), the first handling unit (14, 14') includes a first drive control system (24, 24') which is operatively connected to a first drive (26, 26', 26"), the second handling unit (16, 16', 16") includes a second drive control system (28) which is operatively connected to a second drive (30), the main drive control system (18) and also the first and second drive control systems (24, 28) are operatively connected to one another via a first data bus (32, 32'), wherein the first handling unit (14, 14') includes a first data collector (34, 34') which is connected to the main drive control system (18) and the first drive control system (24, 24') via the first data bus (32, 32'), and the second handling unit (16, 16', 16") includes a second data collector (36, 36') which is connected to the first drive control system (24, 24') and the second drive control system (28) via the first data bus (32, 32').

2. The apparatus as claimed in claim 1, wherein the product collection unit (12, 12a) comprises:
a first controller (38) which is connected to the main drive control system (18) and the first data bus (32, 32').

3. The apparatus as claimed in claim 2, wherein the main drive (20, 20') comprises:
an associated first sensing element (40, 40') for sensing a first actual value (42, 42') for the main drive (20, 20'), and the first sensing element (40, 40') is connected to the main drive control system (18) via a first connection, comprising a first signal line (44, 44').

4. The apparatus as claimed in claim 3, wherein the conveyor means (22, 22a, 22b) comprises:
an associated second sensing element (46, 46') for sensing a second actual value (48, 48'), said second sensing element being connected to the main drive control system (18) via a second connection, comprising a second signal line (50, 50').

5. The apparatus as claimed in claim 1, wherein at least one of the first handling unit and the second handling unit (14, 14', 16, 16', 16") is respectively of modular design.

6. The apparatus as claimed in claim 2, wherein the first controller (38) is connected to a superordinate unit (54), comprising a superordinate data collector (54), via a second data bus (52).

7. The apparatus as claimed in claim 1, wherein the second handling unit (16") is in the form of an initial collection apparatus and includes an initial product collection unit (56) and also a first initial handling unit (58) and a second initial handling unit (60) for synchronized handling for supply of products, wherein the initial product collection unit (56) includes, in place of the second data collector (56), a second controller (62) which is operatively connected to the second drive (30) via the second drive control system (28) for the purpose of driving an initial conveyor means (64), the first initial handling unit (58) includes a first initial drive control system (66) which is operatively connected to a first initial drive (68), the second initial handling unit (60) includes a second initial drive control system (70) which is operatively connected to the second initial drive (72), the second drive control system (28) and the first and second initial drive control systems (66, 70) are operatively connected to one another via a third data bus, the second drive (30) includes an associated third sensing element (76) for sensing a third actual value (78) for the second drive (30), said third sensing element being connected to the second drive control system (28") via a third connection comprising a signal line (44), the first initial handling unit (58) includes a first initial data collector (82) which is operatively connected to the second drive control system (28") and the first initial drive control system (66), the second initial handling unit (60) includes a second initial data collector (84) which is operatively connected to the first initial drive control system (66) and the second subordinate drive control system (70), and the initial conveyor means (64) includes an associated fourth sensing element (86) for sensing a fourth actual value (88) for the initial conveyor means (64), wherein the sensing element (86) is connected to the second drive control system (28") via a fourth connection (90) comprising a signal line (90).

8. The apparatus as claimed in claim 1, wherein the conveyor means (22, 22a, 22b) comprises one of an insertion, collection or collation apparatus.

9. The apparatus as claimed in claim 8, wherein the conveyor means (22) comprises a first conveyor means (22a) and a second conveyor means (22b), wherein the first conveyor means (22a) includes an associated first main drive (20) and the second conveyor means (22b) includes an associated second main drive (20'), and the first and second main drives (20, 20') are jointly operatively connected to the main drive control system (18).

10. The apparatus as claimed claim 1, wherein the conveyor means (22) is a conveyor belt.

11. The apparatus as claimed in claim 10, wherein the conveyor belt (22) includes fan-like compartments.

12. The apparatus as claimed in claim 1, wherein the main drive (20, 20') and also the first and second drives (26, 26', 26", 30, 30') are driven by means of a respective power element (96a, 96a', 96b, 96b'), comprising an angle-synchronized frequency converter, wherein the respective power elements (96a, 96a', 96b, 96b') are connected, for control purposes, to their associated main drive control system (18) or to the first or second drive controller (24, 24', 28) via a respective dedicated subordinate data bus (98, 98', 98a, 98a', 98b, 98b').

13. The apparatus as claimed in claim 12, wherein the main drive control system (18) and/or the first drive control system (24, 24') and/or the second drive control system (26, 26', 26") are respectively connected to a plurality of power elements (96, 96', 96a', 96a") for the purpose of driving a plurality of drives (26, 26', 26").

14. The apparatus as claimed in claim 12 further comprising a power element (96a') as a master is connected to a further power element (96a") as a slave to actuate further drives (26").

15. A method for inserting, collecting or collating a multiplicity of flexible, two-dimensional products, including printer's products, with an apparatus (10, 10a, 10b) which has a product collection unit (12), a first handling unit (14, 14') and a second handling unit (16, 16', 16"), wherein the first handling unit (14, 14') and the second handling unit (16, 16', 16") are designed for synchronized handling, for example supply of products, the main drive control system (18) is operatively connected to a main drive (20, 20') for driving a conveyor means (22), the first handling unit (14, 14') includes a first drive control system (24, 24') and a first drive (26, 26', 26") which is controlled by means of the first drive control system (24, 24'), the second handling unit (16, 16', 16") includes a second drive control system (28) and a second drive (30) which is controlled by means of the second drive control system (28), the main drive control system (18) and also the first and second drive control systems (24, 24', 28) interchange data via a first data bus (32, 32'), wherein the first handling unit (14, 14') includes a first data collector (34, 34') and the second handling unit (16, 16', 16") includes a second data collector (36, 36'), and data from the main drive control system (18) which are intended for the second drive control system (26, 26', 26") are transmitted to the second drive control system (28, 28', 28") successively via the first data collector (34, 34'), the first drive control system (24, 24') and the second data collector (36, 36').

16. The method as claimed in claim 15, wherein the product collection unit (12, 12a) includes a first controller (38) which is connected to the main drive control system (18) for the purpose of interchanging data via the first data bus (32).

17. The method as claimed in claim 16 wherein the first data bus (32, 32') transmits data in real time and to this end includes a bus frame (100), into and from which the first controller (38), the main drive controller (18), the first and second drive control systems (24, 24', 28, 28', 28") and the first and second data collectors (34, 34', 36, 36') read data.

18. The method as claimed in claim 15 wherein the main drive (20, 20') comprises an associated first sensing element (40, 40') which senses a first actual value (42, 42') for the main drive (20, 20') and transmits it to the main drive control system (18).

19. The method as claimed in claim 18, wherein the conveyor means (22, 22a, 22b) includes an associated second sensing element (46, 46') which senses a second actual value (48, 48') for the conveyor means (22) and transmits it to the main drive control system (18).

20. The method as claimed in claims 15 wherein the conveyor means (22) comprises a first conveyor means (22a) and a second conveyor means (22b), wherein the first conveyor means (22a) includes an associated first main drive (20a), and the second conveyor means (22b) includes an associated second main drive (22b), and the first and second main drives (20a, 20b) are jointly operatively connected to the main drive control system (18) and are actuated by the main drive control system (18) such that the first conveyor means (22a) and the second conveyor means (22b) can be driven both independently of one another and in sync with one another.

21. The method as claimed in claim 15, wherein data from the first controller (38) are interchanged with a superordinate unit (54), comprising a superordinate data collector, via a second data bus (52).

22. The method as claimed in claim 15, wherein the main drive control system (18) produces a guide value (102, 102') and transmits it with the first actual value (42, 42') and the second actual value (48, 48') to the first drive control system (24, 24') via the first data collector (34, 34'), whereupon the first drive control system (24, 24') ascertains a first target value (104, 104') for the first drive (26, 26'), and the main drive control system (18) transmits the guide value (102, 102') and also the first actual value (42, 42') and the second actual value (48, 48') to the second drive control system (28, 28'), whereupon the second drive control system (28, 28') ascertains a second target value (106, 106') for the second drive (30, 30').

* * * * *